US010225973B2

(12) United States Patent
Gray et al.

(10) Patent No.: US 10,225,973 B2
(45) Date of Patent: *Mar. 12, 2019

(54) TINE HARROW

(71) Applicant: Salford Group Inc., Salford (CA)

(72) Inventors: Geof J. Gray, Burford (CA); John Mark Averink, Norwich (CA); Jonathan Gillier, Ingersoll (CA); Bradley William Baker, Stratford (CA)

(73) Assignee: Salford Group Inc., Salford (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,664

(22) Filed: Jun. 22, 2018

(65) Prior Publication Data

US 2018/0295768 A1 Oct. 18, 2018

Related U.S. Application Data

(63) Continuation of application No. 14/995,763, filed on Jan. 14, 2016, now Pat. No. 10,117,373.

(60) Provisional application No. 62/114,242, filed on Feb. 10, 2015.

(51) Int. Cl.
*A01B 63/24* (2006.01)
*A01B 63/00* (2006.01)
*A01B 19/02* (2006.01)

(52) U.S. Cl.
CPC .............. *A01B 63/24* (2013.01); *A01B 19/02* (2013.01); *A01B 63/008* (2013.01)

(58) Field of Classification Search
CPC ....... A01B 63/008; A01B 63/24; A01B 63/30; A01B 63/32; A01B 21/02; A01B 21/06; A01B 19/02
See application file for complete search history.

(56) References Cited

U.S. PATENT DOCUMENTS

| 3,255,831 A | | 6/1966 | Kirkpatrick, Jr. | |
| 4,561,504 A | * | 12/1985 | Andersen | A01B 23/046 172/142 |
| 4,615,286 A | * | 10/1986 | Linton | A01C 15/005 111/52 |
| 5,492,182 A | * | 2/1996 | Delaurier | A01B 19/02 172/615 |
| 5,988,294 A | * | 11/1999 | Hubscher | A01B 35/30 172/142 |

(Continued)

OTHER PUBLICATIONS

Office Action dated Oct. 30, 2017 on U.S. Appl. No. 14/995,763.

*Primary Examiner* — Jessica H Lutz
(74) *Attorney, Agent, or Firm* — Brunet & Co. Ltd.; Robert Brunet; Hans Koenig

(57) ABSTRACT

A tine harrow has a plurality of harrow tines mounted on and downwardly depending from a harrow frame. The tines are configured to be movable between a lowered position and a raised position, and at least one tine lowerable or raiseable to a different relative position in relation to a surface of a field than others of the tines. The ability to lower and raise individual tines or rows of tines to different positions in relation to a surface of a field provides more effective response of the tine harrow to changing land conditions. The positions to which individual tines or rows of tines are lowered or raised may be selectively set to further enhance effectiveness of the response of the tine harrow to changing land conditions.

9 Claims, 9 Drawing Sheets

(56) References Cited

U.S. PATENT DOCUMENTS

| | | | |
|---|---|---|---|
| 6,264,386 B1 | 7/2001 | Sugahara | |
| 7,762,345 B2 | 7/2010 | Rozendaal | |
| 7,766,093 B2 * | 8/2010 | Becker | A01B 63/32 |
| | | | 172/133 |
| 8,113,295 B2 | 2/2012 | Rozendaal | |
| 8,196,672 B2 | 6/2012 | Rozendaal | |
| 8,307,908 B2 | 11/2012 | Rozendaal | |
| 8,307,909 B1 | 11/2012 | Rozendaal | |
| 8,657,026 B2 * | 2/2014 | Friesen | A01B 63/32 |
| | | | 172/452 |
| 9,301,439 B2 * | 4/2016 | Gilstring | A01B 49/027 |

* cited by examiner

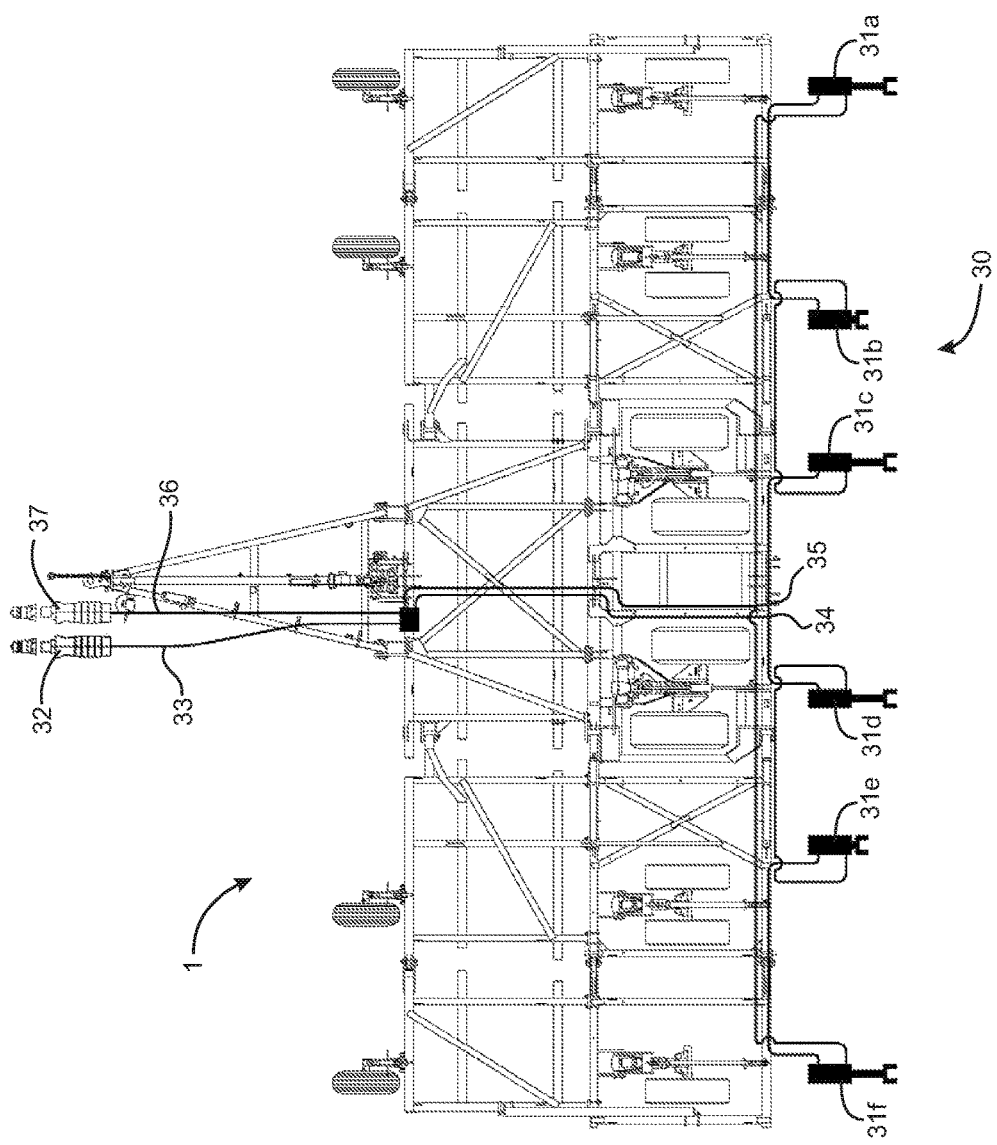

TINE HARROW

CROSS-REFERENCE TO RELATED APPLICATIONS

This application is a continuation of U.S. Ser. No. 14/995,763 filed Jan. 14, 2016, which claims the benefit of U.S. Provisional Patent Application Ser. No. 62/114,242 filed Feb. 10, 2015, the entire contents of both of which are herein incorporated by reference.

FIELD OF THE INVENTION

The present invention relates to an apparatus, system and method for tilling a field. In particular, the present invention relates to control of a tine harrow, especially as part of an apparatus, system and method for a conservation tillage strategy.

BACKGROUND OF THE INVENTION

Apparatuses, systems and methods for tilling agricultural fields are very well known in the art. Apparatuses typically comprise a cultivator frame having multiple and various tilling attachments attached thereto, laid out on the frame in a variety of patterns to maximize the desired tilling effect. The apparatus is dragged behind a vehicle during the tilling operation.

In particular, conservation tillage, or vertical tillage as it is sometimes called, has recently become a tilling strategy of choice in many instances. Conservation tillage minimally disturbs the soil prior to planting in order to allow air to penetrate the mat of crop residue left in the field from the previous harvest. Apparatuses, systems and methods for conservation tillage are known in the art, for example United States patents U.S. Pat. No. 7,762,345 issued Jul. 27, 2010, U.S. Pat. No. 8,113,295 issued Feb. 14, 2012, U.S. Pat. No. 8,196,672 issue Jun. 12, 2012, U.S. Pat. No. 8,307,908 issued Nov. 13, 2012 and U.S. Pat. No. 8,307,909 issued Nov. 13, 2012, the entire contents of all of which are herein incorporated by reference.

In addition to coulter wheels, chisel plows, V-shaped shovels, sub-soiling teeth and other field working tools, a tillage apparatus may comprise leveling attachments at the rear of the cultivator frame. The leveling attachments may be mounted to a rear transverse cross-member of the frame. Leveling attachments may comprise, for example, spike or tine harrows, leveling bars, rotary harrows, etc., which are dragged behind the cultivator frame to level the field after the field is worked by the field working tools.

A conservation tillage apparatus may be drawn at faster speeds than conventional tillage apparatuses. Although there is no theoretical upper limit on speed, conservation tillage apparatuses may be operated at speeds of from 8-18 miles per hour. Operating at such faster speeds causes the crop residue to be cut more finely and reduces the likelihood of becoming stuck in wet soil conditions. However, operating at faster speeds, especially above 12 miles per hour, can create significant problems with leveling attachments being dragged behind the cultivator frame.

Harrows are implements (leveling attachments) comprising sets of teeth, tines or ridges that when dragged over ploughed land break up clods, remove weeds, and cover seed. A tine harrow is a harrow having a plurality of narrow profile tines or spikes downwardly depending from a harrow frame. The tines may be spaced apart transversely on the harrow frame to form a row, and a plurality of rows may be spaced apart longitudinally on the harrow frame to form an array of tines on the harrow frame. Two or more harrow frames may be mounted at the rear of the cultivator frame, usually forming a transverse row of tine harrows. Adjusting the angle of the harrow tines changes how aggressively the tines interact with the land by raising and lowering the ends of the tines with respect to the land. The desired aggressiveness of the harrow tines depends on land conditions, which may change from day-to-day, or even from place-to-place on the land. Angle adjustment of the tines is generally done collectively so that the angles of all of the tines on a given harrow frame, and indeed all of the tines on all the harrow frames mounted on the cultivator frame, are changed at the same time. A number of ways to accomplish such angle changes are known in the art, for example as described in U.S. Pat. No. 8,657,026 issued Feb. 25, 2014.

However, prior art apparatuses do not permit independent control of each tine or at least a single row of tines, which limits the effectiveness of the tine harrow in changing land conditions. There remains a need for ways of adjusting the position of individual tines or individual tine rows in one or more tine harrows in relation to a surface of the land.

SUMMARY OF THE INVENTION

According to the present invention, there is provided a tine harrow comprising a plurality of harrow tines mounted on and downwardly depending from a harrow frame, the tines configured to be movable between a lowered position and a raised position, at least one tine lowerable or raiseable to a different relative position in relation to a surface of a field than others of the tines.

The ability to lower and raise individual tines or rows of tines to different positions in relation to a surface of a field provides more effective response of the tine harrow to changing land conditions. Depending on the positions to which the tines may be set, the tines may interact with the field less or more aggressively. In some embodiments, the tines may interact with the field when in either of the lowered or raised positions, and the positions to which the tines may be set may change how aggressively the tines interact with the field when the tines are in both the lowered and raised positions. In other embodiments, the tines may interact with the field when in the lowered position but not when in the raised position, and the positions to which the tines may be set may change how aggressively the tines interact with the field when the tines are in the lowered position.

Further, rather than the at least one tine having just one position to which the tine may be lowered or raised, the position to which the at least one tine may be lowered or raised may be set selectively to one of a plurality of different positions to further enhance effectiveness of the response of the tine harrow to changing land conditions. Selectively setting the position of the at least one tine comprises the ability to select tine position from a plurality of different possible positions. Thus, those tines or rows of tines whose positions can be selectively set may have a plurality of different possible lowered or raised positions in relation to the field, which may be selected depending on land conditions, operator desires or any other factor. Being able to independently control the position in relation to the field of individual tines or tines in individual rows of tines, for example by independently controlling the angle or pitch of the tines, also permits control over down-pressure of the tines, which permits control over whether residue is let through the harrow or not.

The harrow frame may be mounted on a cultivator frame as part of a tillage apparatus. The cultivator frame has a longitudinal axis in the direction of motion of the tillage apparatus as it is being dragged across the land. The longitudinal axis runs from front to rear (or rear to front) of the cultivator frame. The cultivator frame has a transverse axis that is perpendicular to the longitudinal axis and runs left to right (or right to left) of the cultivator frame. The front end of the cultivator frame is mounted to the transportation (e.g. vehicle) that drags the apparatus. The cultivator frame may have a plurality of longitudinally spaced apart transverse frame-members and a plurality of transversely spaced apart longitudinal frame-members.

The harrow frame is preferably mounted at a rear of the cultivator frame. Directionality in relation to the harrow frame may be expressed in the same manner as directionality in relation to the cultivator frame. The harrow frame may comprise longitudinally spaced apart transverse harrow frame-members and a plurality of transversely spaced apart longitudinal harrow frame-members. The tines may be mounted on any of the harrow frame-members. Preferably, the tines are mounted in a plurality of transverse rows on rotatable transverse harrow frame-members.

The harrow frame may comprise at least one section of tines. In some embodiments, the tines may be arranged in a plurality of transverse rows in the section. In some embodiments, the tines in at least one transverse row in at least one of the at least one sections are lowerable or raiseable to the different relative position in relation to the surface of the field than others of the tines. In some embodiments, the tines that are lowerable or raiseable to the different relative position may be selectively lowerable or raiseable to at least two different relative positions.

In some embodiments, the tines may be lowered and raised by rotation of the tines about respective transverse axes. The transverse axes may be defined by longitudinally spaced-apart rotatable transverse axles mounted on the harrow frame. The transverse axles may have the tines mounted thereon. The tines may be configured on the transverse axles so that rotation of the transverse axles rotates the tines through an angle, which lowers or raises ends of the tines.

Any suitable mechanism may be employed for lowering and raising the tines. For example, actuating mechanisms (actuators) may be configured to move one or more tines between the lowered and raised positions. Some examples of actuators include hydraulic cylinders (e.g. rephasing hydraulic cylinders), electrical actuators (e.g. linear actuators), mechanical actuators, pneumatic actuators (e.g. inflatable bags) and motors (e.g. hydraulic and electric motors). A given actuator may be configured to move individual tines or groups of tines. Groups of tines may be all of the tines on the harrow, sections of tines or rows of tines. In one embodiment, each tine may be connected to a dedicated actuator so that the raising and lowering of each tine may be independently controlled. In another embodiment, only the tines for which a different relative position is desired may be connected to dedicated actuators while others of the tines are lowered and raised together by an actuator. Preferably, one actuator is responsible for lowering and raising one section of tines, and the tines within that section for which a different relative position is desired are connected to the actuator by a mechanism for effecting the different relative position.

Configuring the actuators to move the tines may be accomplished in any manner suitable for the type of actuator being used. Actuators may be connected to the tines through any one or more of mechanical linkages, wheels (e.g. pulleys, sprockets, pinions, gears, etc.), pressure lines and the like. For example, a linkage arm may be connected to transverse axles and translation of the linkage arm, for example longitudinal translation, rotates the transverse axles about a transverse axes thereby rotating the tines thereby lowering or raising the tines. In another embodiment, wheels mounted on longitudinally spaced apart transverse axles may be interconnected by a common drive structure configured to rotate the wheels thereby rotating the transverse axles about the transverse axes thereby rotating the tines thereby lowering or raising the tines.

To effect a different relative position for certain tines or rows of tines, the connections between the actuators and the tines may be suitably adapted. In one embodiment, connecting arms may connect longitudinally spaced apart transverse axles to a linkage arm where at least one of the connecting arms is connected to the linkage arm at a different relative location in relation to their transverse axles than the other connecting arms in relation to their transverse axles. The angles at which the tines depend from the respective transverse axles are therefore different, resulting in a different relative position of the tines in relation to the field. Such an arrangement may be made selective by permitting selective connection of at least one of the connecting arms to the linkage arm at least two different longitudinally spaced-apart locations on the linkage arm and/or at least two different spaced-apart locations on the connecting arm. In selective connection, the locations are configured so that connection of the at least one of the connecting arms at a first location selects a first relative position in relation to the surface of the field to which the tines may be lowered or raised, and connection of the at least one of the connecting arms at a second location selects a second relative position in relation to the surface of the field to which the tines may be lowered or raised. Connecting arms may be connectable to the linkage arm in any suitable manner that permits rotation of the transverse axles by translation of the linkage arm. Such connections may permit rotational motion at the connection, and may in some embodiments be accomplished by a pin through aperture arrangement, ball and socket arrangement, or the like.

In another embodiment, with wheels mounted on longitudinally spaced apart transverse axles and a common drive structure configured to rotate the wheels together, the common drive structure may comprise a driven endless loop (e.g. a chain, belt or the like) around the wheels or a translatable toothed rack mounted on the harrow frame where the wheels are sprockets, pinions, gears or the like having teeth that mesh with the teeth of the rack. In this embodiment, at least one of the wheels may be configured differently to rotate by a different amount than others of the wheels thereby rotating the transverse axle of the differently configured wheel by a different amount thereby lowering or raising the tines on the transverse axle of the differently configured wheel by a different amount than others of the tines. The differently configured wheel may comprise a different diameter, a different number of teeth, differently spaced teeth or combinations thereof. The wheels may be replaceable with other wheels of different configurations (e.g. different diameters, number of teeth or teeth spacing) to permit selection of the amount by which the desired tines are lowerable or raiseable.

The tillage apparatus is preferably a conservation tillage apparatus. The tillage apparatus may have one or more other leveling attachments mounted thereon, for example other spike harrows, leveling bars, rotary harrows, etc. The tillage apparatus may have one or more field working tools mounted thereon, for example coulter wheels, chisel plows, V-shaped shovels, sub-soiling teeth, etc. Leveling attachments are generally mounted on the cultivator frame rearward of the field working tools.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIG. 1C is a schematic diagram of a hydraulic circuit for use with rephasing hydraulic cylinders for lowering and raising tines of sections of a tine harrow, the hydraulic circuit being shown in context with a cultivator frame to a rear of which the sections of the tine harrow are attached.

DESCRIPTION OF PREFERRED EMBODIMENTS

FIG. 1A, FIG. 1C, FIG. 2, FIG. 3 and FIG. 4 illustrate aspects of various preferred embodiments of actuating mechanisms by which tines or rows of tines of a tine harrow may be lowered and raised. The actuating mechanisms permit "on-the-fly" lowering and raising of tine harrow sections between the lowered and raised positions of the tines. In one embodiment, a lowermost position of the tines is a field-engaging position, while an uppermost position of the tines is a field-disengaging position. In another embodiment, both the lowermost and uppermost positions may be field-engaging. FIG. 1C, FIG. 5A, FIG. 5B, FIG. 5C, FIG. 6 and FIG. 7 illustrate various aspects of preferred embodiments of arrangements for selectively controlling relative positions of the tines in relation to the surface of the field. With appropriate design, any of the actuating mechanisms for lowering and raising the tines or rows of tines may be combined with any one or more of the arrangements for selectively controlling relative positions of the tines in relation to the surface of the field.

Figure 1A:
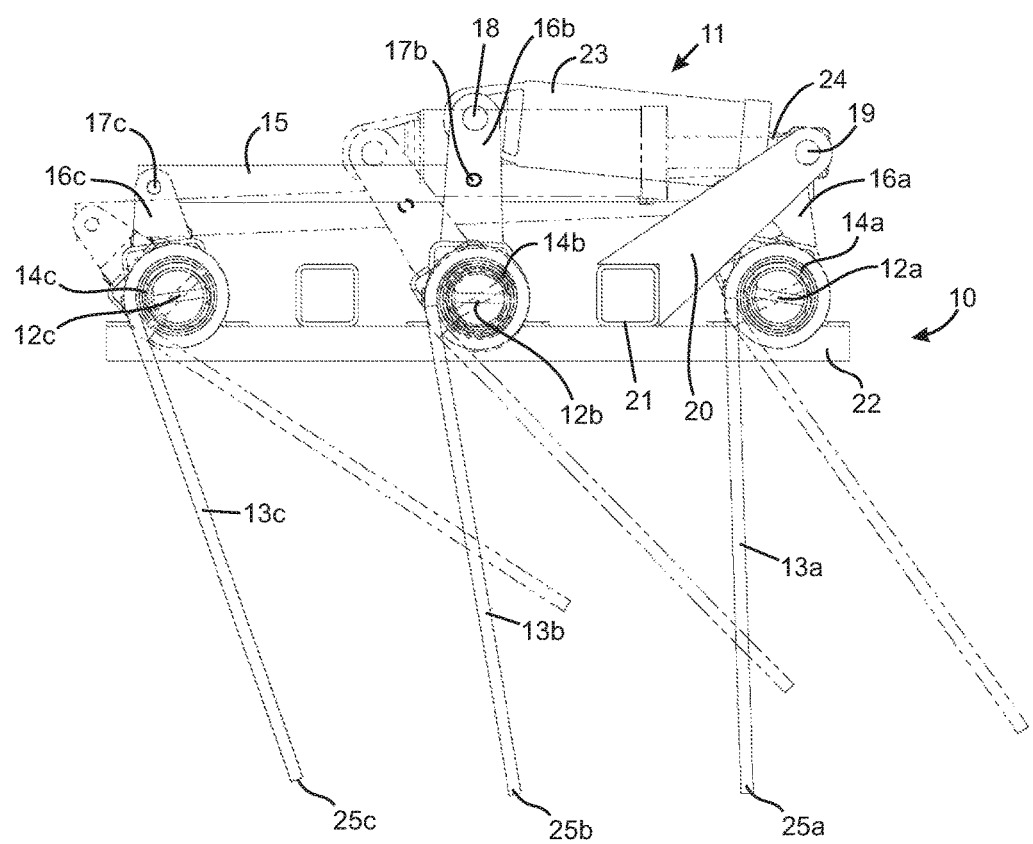
FIG. 1A is a side view of a section of a tine harrow having three transverse rows of harrow tines illustrating how the tines may be lowered and raised by a rephasing hydraulic cylinder.

FIG. 1A depicts the use of a hydraulic cylinder 11, for example a rephasing hydraulic cylinder, configured to lower and raise a harrow section 10 having three transverse rows 12a, 12b, 12c of harrow tines 13a, 13b, 13c. Because FIG. 1A is a side view, other tines in each of the rows 12a, 12b, 12c are not seen. The tines 13a, 13b, 13c in each row 12a, 12b, 12c are mounted on respective transverse rotatable axles 14a, 14b, 14c. The axles 14a, 14b, 14c are connected to an elongated longitudinally-oriented and translatable linkage bar 15 through respective connecting bars 16a, 16b, 16c. The connecting bars 16a, 16b, 16c are rigidly connected to the axles 14a, 14b, 14c, and are pivotally connected to the linkage bar 15 by pins 17a (not visible), 17b, 17c through apertures in the linkage bar 15. One of the connecting bars 16b is also pivotally connected at first cylinder pivot point 18 to one end of the hydraulic cylinder 11. The other end of the hydraulic cylinder 11 is pivotally connected at second cylinder pivot point 19 to a mounting arm 20 rigidly mounted through a mounting tube 21 on a longitudinal frame-member 22 of the harrow section 10. The hydraulic cylinder 11 comprises a barrel 23 and an extendible rod 24, and the barrel 23 is shown connected at pivot point 18 while the rod 24 is shown connected at pivot point 19. However, the hydraulic cylinder 11 may be reversed so that the barrel 23 is connected at pivot point 19 while the rod 24 is connected at pivot point 18. In operation, extension or retraction of the rod 24 causes translation of the connecting bar 16b in an arcuate path, which in turn causes longitudinal translation of the linkage bar 15. Because the connecting bars 16a, 16b, 16c are pivotally connected to the linkage bar 15, translation of the linkage bar 15 causes translation of the connecting bars 16a, 16c along an arcuate path in a manner similar to connecting bar 16b. The arcuate translation of the connecting bars 16a, 16b, 16c causes rotation of the axles 14a, 14b, 14c, which causes the 13a, 13b, 13c to rotate thereby lowering or raising distal ends 25a, 25b, 25c of the tines 13a, 13b, 13c. In FIG. 1A, the tines 13a, 13b, 13c, the connecting bars 16a, 16b, 16c, the linkage bar 15 and the hydraulic cylinder 11 are shown in solid lines when the tines 13a, 13b, 13c are in a lowered position and in dashed lines when the tines 13a, 13b, 13c are in a raised position. In FIG. 1A, extension of the rod 24 raises the tines 13a, 13b, 13c into the raised position; however, the hydraulic cylinder 11 may instead be configured to raise the tines 13a, 13b, 13c into the raised position when the rod 24 retracts.

Figure 1B:
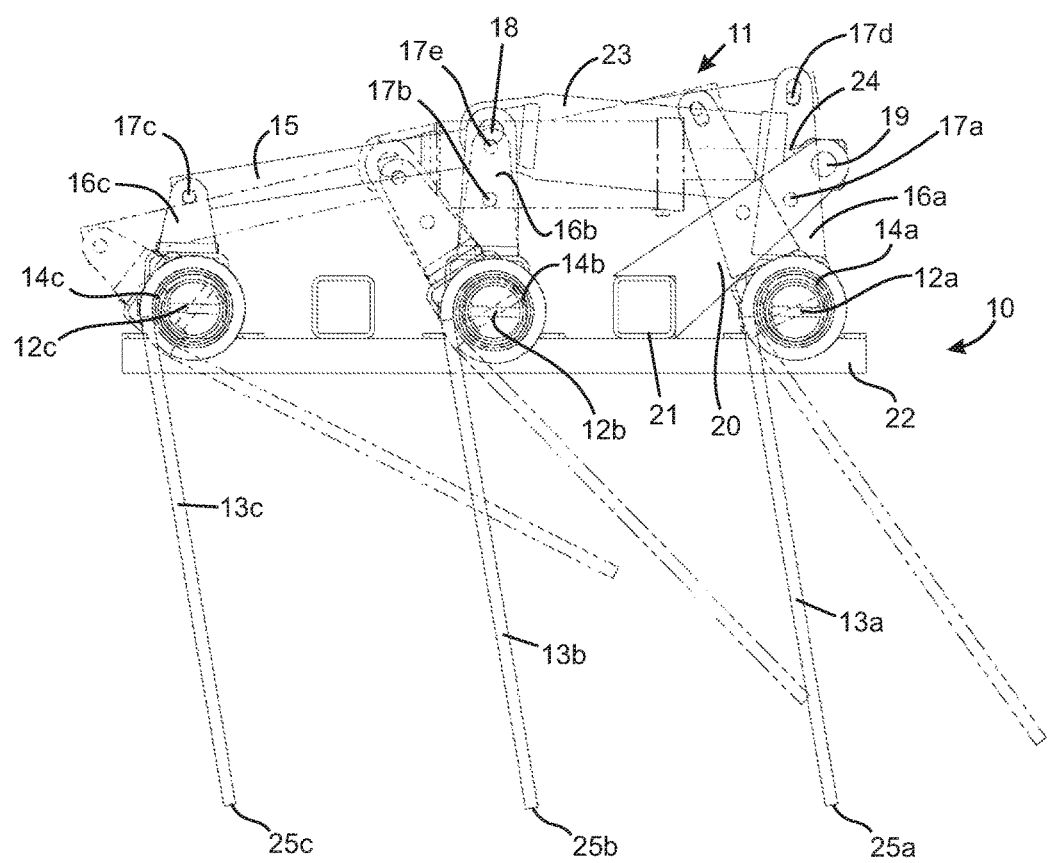
FIG. 1B is a side view of a section of a tine harrow having three transverse rows of harrow tines illustrating another arrangement of how the tines may be lowered and raised by a rephasing hydraulic cylinder.

FIG. 1B depicts an arrangement similar to FIG. 1A except that the connecting bars 16a, 16b each have two possible points of pivoting connection 17a, 17d and 17b, 17e, respectively, to the linkage bar 15. As in the embodiment depicted in FIG. 1A, the harrow section 10 has three transverse rows 12a, 12b, 12c of harrow tines 13a, 13b, 13c. Because FIG. 1B is a side view, other tines in each of the rows 12a, 12b, 12c are not seen. The tines 13a, 13b, 13c in each row 12a, 12b, 12c are mounted on respective transverse rotatable axles 14a, 14b, 14c. The axles 14a, 14b, 14c are connected to the elongated longitudinally-oriented and translatable linkage bar 15 through respective connecting bars 16a, 16b, 16c. The connecting bars 16a, 16b, 16c are rigidly connected to the axles 14a, 14b, 14c, and are pivotally connected to the linkage bar 15 by pins 17*d*, 17*e*, 17*c* through apertures in the linkage bar 15. The connecting bar 16*a* has a possible second point of pivoting connection 17*a* to the linkage bar 15, and the connecting bar 16*b* also has a possible second point of pivoting connection 17*b* to the linkage bar 15. The extra possible points of connection on the connecting bars permit selective control of the relative positions of the tines in relation to a surface of a field, because connecting the linkage bar 15 to a different point on one or both of connecting bars 16*a*, 16*b* will change the angle through which the tines rotate for the same translational distance of the linkage bar 15. Other features illustrated in FIG. 1B function similarly to the corresponding features in FIG. 1A.

Referring to FIG. 1C, a hydraulic circuit 30 is depicted for use with rephasing hydraulic cylinders 31*a-f* for lowering and raising tines of sections of a tine harrow. The hydraulic circuit 30 is shown in context with a cultivator frame 1 to a rear of which the sections of the tine harrow (not shown) are attached. The rear of the cultivator frame is toward the bottom of FIG. 1C.

Rephasing hydraulic cylinders are two or more hydraulic cylinders plumbed in series or parallel, with the bores and rods sized such that all rods extend and/or retract equally when hydraulic fluid flow is directed to the first, or last, cylinder within the hydraulic circuit. Preferably, the rephasing hydraulic cylinders are plumbed in series. In series applications, the bore and rod sizes are typically different. This hydraulic synchronization of rod positions eliminates the need for a flow divider in the hydraulic system, or any type of mechanical connection between the cylinder rods to achieve synchronization. The rephasing hydraulic cylinders on the tine harrow may all point in one direction such that extension of the rods is all toward the front or to the rear, or directions in which the cylinder point may have some cylinder rods extending toward the front while the rods of other cylinders extend toward the rear. The best arrangement for a given application may depend on the combination that permits the most efficient hydraulic circuitry. For the present tine harrow application, having all of the rods extend in the same direction is preferred.

As seen in FIG. 1C, the hydraulic circuit 30 comprises a plurality of hydraulic lines containing hydraulic fluid for transmitting hydraulic pressure to the rephasing hydraulic cylinders 31*a-f*. Each cylinder 31*a*, 31*b*, 31*c*, 31*d*, 31*e*, 31*f* controls the lowering and raising of one tine harrow section. Two cylinders may be used to control one section, for example cylinders 31*c-d* together control a main central section of tines. Cylinders 31*a-c* are connected in series with respect to each other and cylinders 31*d-e* are connected in series with respect to each other, but cylinders 31*a-c* are in parallel to cylinders 31*d-e*. Further, neighboring cylinders 31*a-c* on one side of the harrow and neighboring cylinder 31*d-e* on the other side of the harrow alternate in whether extension or retraction of the cylinder lowers the respective harrow sections. Thus, the three cylinders within each of cylinders 31*a-c* and cylinders 31*d-e* are plumbed sequentially from rear-to-rear-to-front. That is, the first cylinders 31*c*, 31*d* of each group closest to the hydraulic supply receive fluid at the front and deliver fluid from the rear, the second cylinders 31*b*, 31*e* of each group receive fluid at the rear and deliver fluid from the front, and the third cylinders 31*a*, 31*f* of each group receive fluid at the front and deliver fluid from the rear. Front is a direction toward the front of the cultivator frame 1 and rear is a direction rearward of the cultivator frame 1. FIG. 1C shows the cylinders 31*a-f* when the harrow sections are lowered. Thus, extension of cylinders 31*a*, 31*c*, 31*d*, 31*f* and retraction of cylinders 31*b*, 31*e* lowers the respective harrow sections.

Under normal operation to lower the harrow sections, hydraulic fluid pressure is transmitted to the circuit from a hydraulic supply and a hydraulic pump on a tractor through a feed line coupled with coupling 32 to hydraulic line 33. Fluid flow is split left and right at line junction 34. Fluid flowing right passes through cylinders 31*c*, 31*b*, 31*a* before returning to line junction 35 and then back via hydraulic line 36 to coupling 37 connected to a return line for returning hydraulic fluid to the hydraulic supply. Likewise, fluid flowing left passes through cylinders 31*d*, 31*e*, 31*f* before returning to line junction 35 and then back via hydraulic line 36 to coupling 37 connected to a return line for returning hydraulic fluid to the hydraulic supply. Raising the harrow sections may be accomplished by reversing the fluid low in the hydraulic circuit. Cylinders 31*c* and 31*d* are preferably tied together so that hydraulic fluid arriving at line junction 34 from line 33 (or line junction 35 from line 36) is distributed evenly between the two sides of the hydraulic circuit 30 even if there may be a difference in load on the two sides of the harrow. The cylinders 31*c* and 31*d* may be tied hydraulically, mechanically or by any other suitable means.

Figure 2:
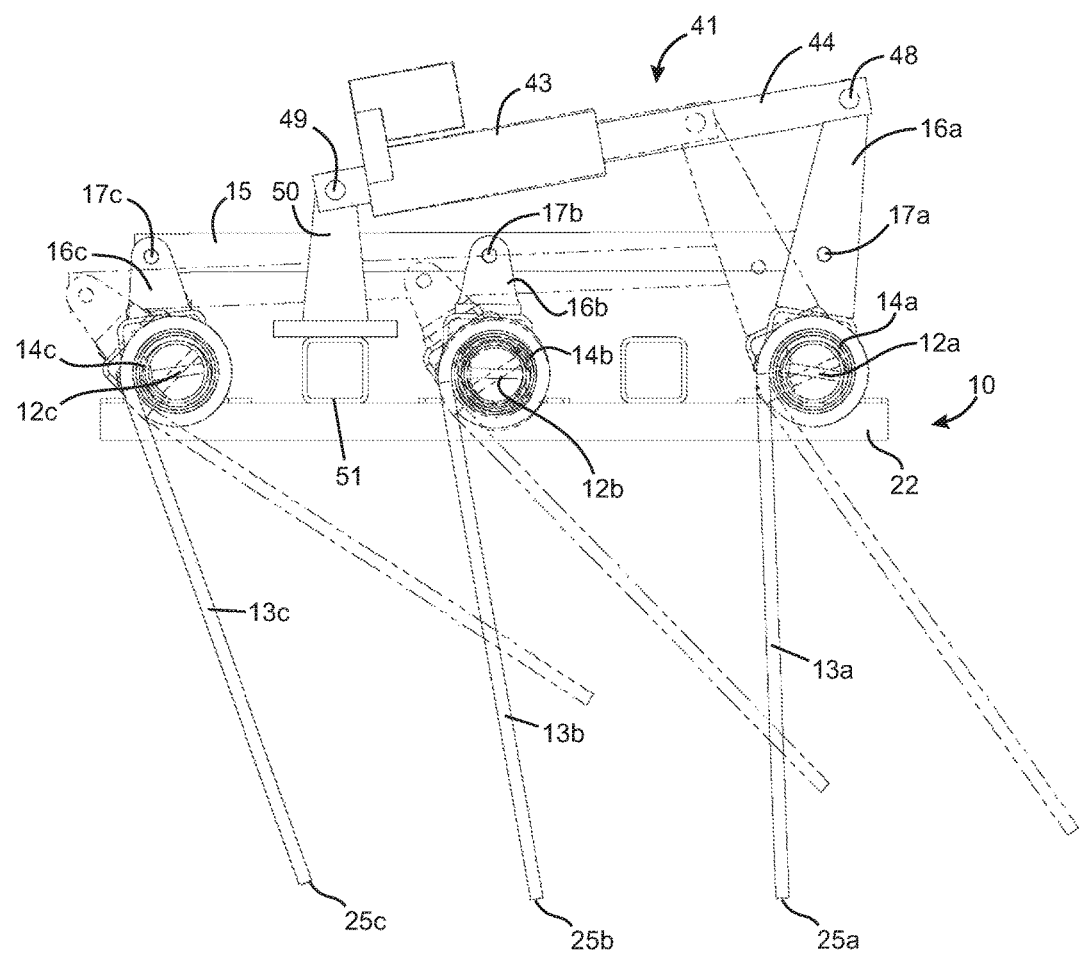
FIG. 2 is a side view of a section of a tine harrow having three transverse rows of harrow tines illustrating how the tines may be lowered and raised by an electrical actuator.

FIG. 2 depicts an arrangement similar to FIG. 1A except that an electrical actuator 41 (e.g. a linear actuator) is used instead of a hydraulic cylinder to lower and raise the harrow section 10. As in the embodiment depicted in FIG. 1A, the harrow section 10 has three transverse rows 12*a*, 12*b*, 12*c* of harrow tines 13*a*, 13*b*, 13*c*. Because FIG. 2 is a side view, other tines in each of the rows 12*a*, 12*b*, 12*c* are not seen. The tines 13*a*, 13*b*, 13*c* in each row 12*a*, 12*b*, 12*c* are mounted on respective transverse rotatable axles 14*a*, 14*b*, 14*c*. The axles 14*a*, 14*b*, 14*c* are connected to the elongated longitudinally-oriented and translatable linkage bar 15 through respective connecting bars 16*a*, 16*b*, 16*c*. The connecting bars 16*a*, 16*b*, 16*c* are rigidly connected to the axles 14*a*, 14*b*, 14*c*, and are pivotally connected to the linkage bar 15 by pins 17*a* (not visible), 17*b*, 17*c* through apertures in the linkage bar 15. One of the connecting bars 16*a* is also pivotally connected at first actuator pivot point 48 to one end of the actuator 41. The other end of the actuator 41 is pivotally connected at second cylinder pivot point 49 to a mounting arm 50 rigidly mounted through a mounting tube 51 on the longitudinal frame-member 22 of the harrow section 10. The actuator 41 comprises a barrel 43 and an extendible rod 44, and the barrel 43 is shown connected at pivot point 49 while the rod 44 is shown connected at pivot point 48. However, the actuator 41 may be reversed so that the barrel 43 is connected at pivot point 48 while the rod 44 is connected at pivot point 49. In operation, extension or retraction of the rod 44 causes translation of the connecting bar 16*a* in an arcuate path, which in turn causes longitudinal translation of the linkage bar 15. Because the connecting bars 16*a*, 16*b*, 16*c* are pivotally connected to the linkage bar 15, translation of the linkage bar 15 causes translation of the connecting bars 16*b*, 16*c* along an arcuate path in a manner similar to connecting bar 16*a*. The arcuate translation of the connecting bars 16*a*, 16*b*, 16*c* causes rotation of the axles 14*a*, 14*b*, 14*c*, which causes the 13*a*, 13*b*, 13*c* to rotate thereby lowering or raising distal ends 25*a*, 25*b*, 25*c* of the tines 13*a*, 13*b*, 13*c*. In FIG. 2, the tines 13*a*, 13*b*, 13*c*, the connecting bars 16*a*, 16*b*, 16*c*, the linkage bar 15 and the actuator 41 are shown in solid lines when the tines 13*a*, 13*b*, 13*c* are in a lowered position and in dashed lines when the tines 13*a*, 13*b*, 13*c* are in a raised position. In FIG. 2, retraction of the rod 44 raises the tines 13*a*, 13*b*, 13*c* into the raised position; however, the actuator 41 may instead be configured to raise the tines 13a, 13b, 13c into the raised position when the rod 44 extends. Electrical actuators have an advantage related to the ability to sense the position of the rod 44, which permits more accurate positioning of the tines 13a, 13b, 13c in a position in relation to the field that is intermediate between the fully lowered position and the fully raised position.

Figure 3:
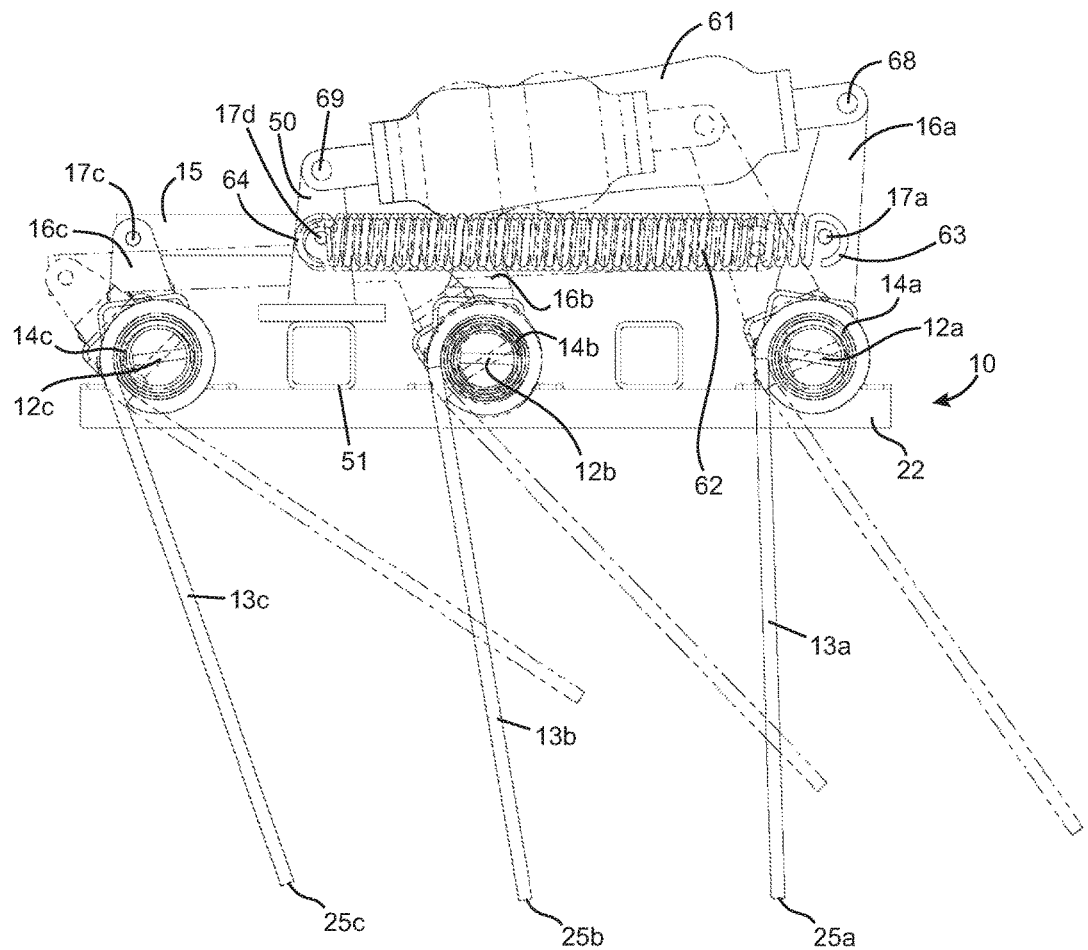
FIG. 3 is a side view of a section of a tine harrow having three transverse rows of harrow tines illustrating how the tines may be lowered and raised by a combination of an inflatable air bag and a tension spring.

FIG. 3 depicts an arrangement similar to FIG. 2 except that an inflatable air bag 61 and a tension spring 62 are used instead of an electrical actuator to lower and raise the harrow section 10. As in the embodiment depicted in FIG. 2, the harrow section 10 has three transverse rows 12a, 12b, 12c of harrow tines 13a, 13b, 13c. Because FIG. 3 is a side view, other tines in each of the rows 12a, 12b, 12c are not seen. The tines 13a, 13b, 13c in each row 12a, 12b, 12c are mounted on respective transverse rotatable axles 14a, 14b, 14c. The axles 14a, 14b, 14c are connected to the elongated longitudinally-oriented and translatable linkage bar 15 through respective connecting bars 16a, 16b, 16c. The connecting bars 16a, 16b, 16c are rigidly connected to the axles 14a, 14b, 14c, and are pivotally connected to the linkage bar 15 by pins 17a, 17b (not visible), 17c through apertures in the linkage bar 15. One of the connecting bars 16a, is also pivotally connected at first air bag pivot point 68 to one end of the air bag 61. The other end of the air bag 61 is pivotally connected at second air bag pivot point 69 to the mounting arm 50 rigidly mounted through the mounting tube 51 on the longitudinal frame-member 22 of the harrow section 10. The tension spring 62 is connected at a first end 63 to the pin 17a and at a second end 64 to a pin 17d to immovably connect the second end 64 of the spring 62 to the mounting arm 50. The first end 63 of the spring 62 is movable in conjunction with the arcuate movement of the connecting bar 16a. However, the mounting of the air bag 61 and the spring 62 may be configured so that the air bag 61 and the spring 62 are immovably mounted at the opposite ends. In operation, inflation of the air bag 61 from a compressed air source, for example a compressor mounted on the vehicle, causes translation of the connecting bar 16a in an arcuate path, which in turn causes longitudinal translation of the linkage bar 15. Because the connecting bars 16a, 16b, 16c are pivotally connected to the linkage bar 15, translation of the linkage bar 15 causes translation of the connecting bars 16b, 16c along an arcuate path in a manner similar to connecting bar 16a. The arcuate translation of the connecting bars 16a, 16b, 16c causes rotation of the axles 14a, 14b, 14c, which causes the 13a, 13b, 13c to rotate thereby lowering distal ends 25a, 25b, 25c of the tines 13a, 13b, 13c. In addition, arcuate movement of the connecting bar 16a caused by inflation of the air bag 61 stretches the tension spring 62. Reducing air pressure in the air bag 61 permits the spring 62 to compress under the force of the tension acquired when the spring 62 was stretched, thereby causing reverse arcuate translation of the connecting bars 16a, 16b, 16c causing reverse rotation of the axles 14a, 14b, 14c, which causes the 13a, 13b, 13c to rotate thereby raising distal ends 25a, 25b, 25c of the tines 13a, 13b, 13c. In FIG. 3, the tines 13a, 13b, 13c, the connecting bars 16a, 16b, 16c, the linkage bar 15, the air bag 61 and the spring 62 are shown in solid lines when the tines 13a, 13b, 13c are in a lowered position and in dashed lines when the tines 13a, 13b, 13c are in a raised position. In FIG. 3, inflation of the air bag 61 lowers the tines 13a, 13b, 13c into the lowered position; however, the air bag 61 may instead be configured to raise the tines 13a, 13b, 13c into the raised position when the air bag 61 is inflated.

Figure 4:
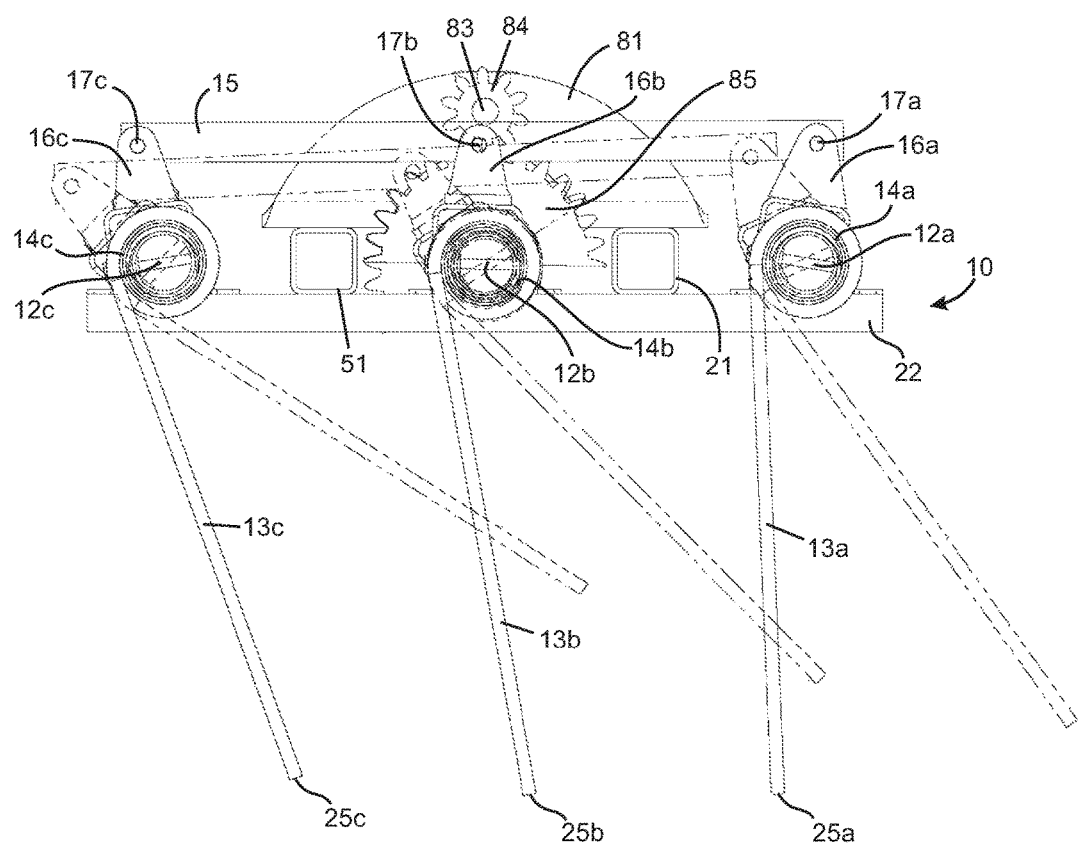
FIG. 4 is a side view of a section of a tine harrow having three transverse rows of harrow tines illustrating how the tines may be lowered and raised by a motor.

FIG. 4 depicts an arrangement similar to FIG. 1A except that a motor 81 (e.g. an electric or hydraulic motor) is used instead of a hydraulic cylinder to lower and raise the harrow section 10. As in the embodiment depicted in FIG. 1A, the harrow section 10 has three transverse rows 12a, 12b, 12c of harrow tines 13a, 13b, 13c. Because FIG. 4 is a side view, other tines in each of the rows 12a, 12b, 12c are not seen. The tines 13a, 13b, 13c in each row 12a, 12b, 12c are mounted on respective transverse rotatable axles 14a, 14b, 14c. The axles 14a, 14b, 14c are connected to the elongated longitudinally-oriented and translatable linkage bar 15 through respective connecting bars 16a, 16b, 16c. The connecting bars 16a, 16b, 16c are rigidly connected to the axles 14a, 14b, 14c, and are pivotally connected to the linkage bar 15 by pins 17a, 17b, 17c through apertures in the linkage bar 15. One of the connecting bars 16b is rigidly connected to a pinion gear 85 having teeth configured to engage teeth of a drive gear 84 mounted on a drive shaft 83 of the motor 81. The motor 81 is rigidly mounted through mounting tubes 21, 51 on the longitudinal frame-member 22 of the harrow section 10. In operation, rotation of the drive shaft 83 causes rotation of the drive gear 84, which causes rotation of the pinion gear 85 by virtue of the meshed teeth of drive gear 84 and the pinion gear 85. Rotation of the pinion gear 85 causes translation of the connecting bar 16b in an arcuate path, which in turn causes longitudinal translation of the linkage bar 15. Because the connecting bars 16a, 16b, 16c are pivotally connected to the linkage bar 15, translation of the linkage bar 15 causes translation of the connecting bars 16a, 16c along an arcuate path in a manner similar to connecting bar 16b. The arcuate translation of the connecting bars 16a, 16b, 16c causes rotation of the axles 14a, 14b, 14c, which causes the 13a, 13b, 13c to rotate thereby lowering or raising distal ends 25a, 25b, 25c of the tines 13a, 13b, 13c. In FIG. 4, the tines 13a, 13b, 13c, the connecting bars 16a, 16b, 16c and the linkage bar 15 are shown in solid lines when the tines 13a, 13b, 13c are in a lowered position and in dashed lines when the tines 13a, 13b, 13c are in a raised position. In FIG. 4, lowering of the tines 13a, 13b, 13c is effected by the motor 81 being driven in one direction, while raising of the tines 13a, 13b, 13c is effected by the motor 81 being driven in the reverse direction.

Figure 5A:
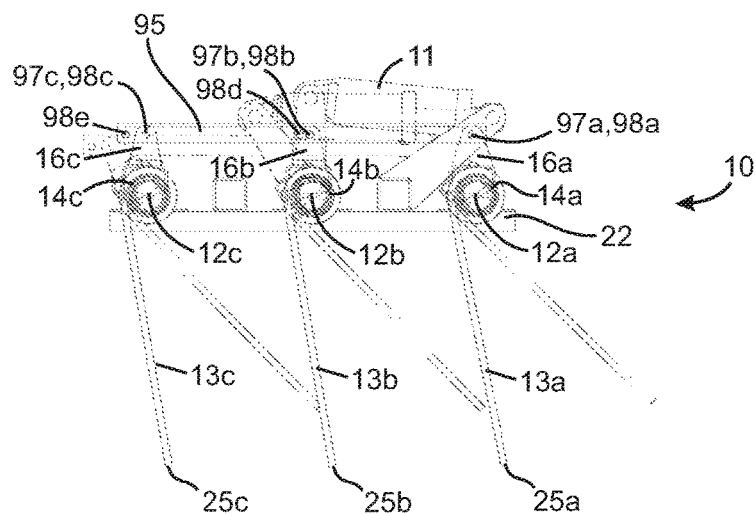
FIG. 5A, FIG. 5B and FIG. 5C are side views of a section of a tine harrow having three transverse rows of harrow tines illustrating how connection of rows of tines at different locations on a translatable linkage arm selectively controls relative positions of the tines in the rows in relation to a surface of a field.
Figure 5B:
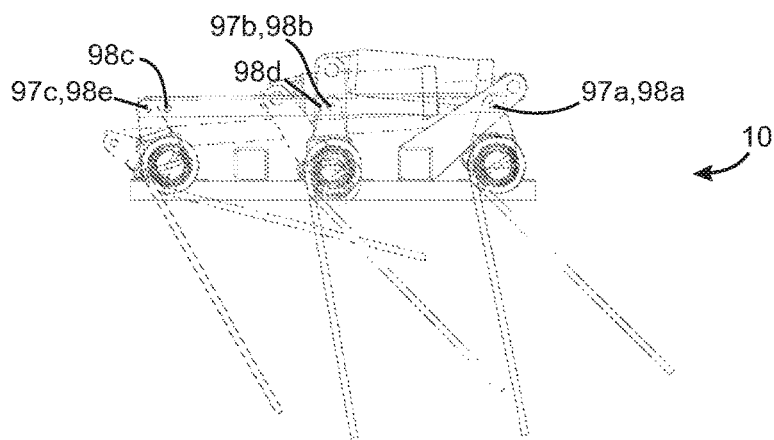
Figure 5C:
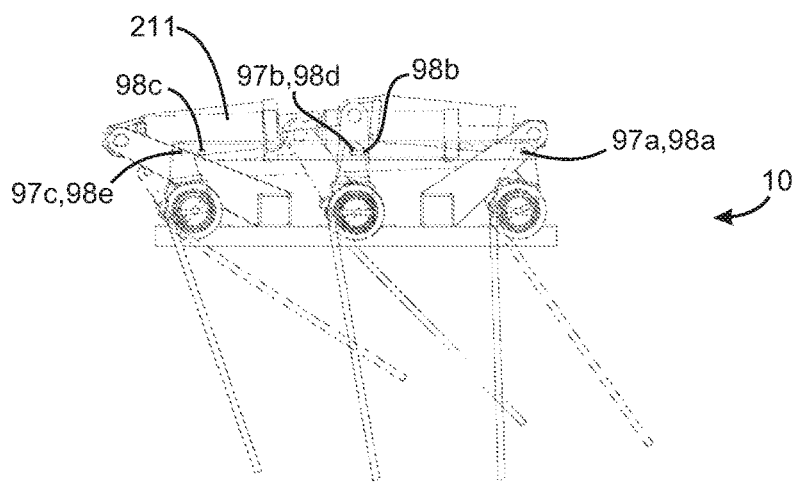

FIG. 5A, FIG. 5B and FIG. 5C illustrate one embodiment of how relative positions of tines of a tine harrow in relation to a surface of a field may be selectively controlled. In FIG. 5A, FIG. 5B and FIG. 5C, the harrow section 10 has three transverse rows 12a, 12b, 12c of harrow tines 13a, 13b, 13c as described in connection with FIG. 1A. The tines 13a, 13b, 13c are lowered and raised by the hydraulic cylinder 11 as described in connection with FIG. 1A. An elongated longitudinally-oriented and translatable linkage bar 95 in FIG. 5A, FIG. 5B and FIG. 5C differs from the linkage bar illustrated in FIG. 1A by having more apertures 98a, 98b, 98c, 98d, 98e, 98f at which the connecting bars 16a, 16b, 16c may be connected. In FIG. 5A, FIG. 5B and FIG. 5C, the tines 13a, 13b, 13c, the connecting bars 16a, 16b, 16c, the linkage bar 95 and the hydraulic cylinder 11 are shown in solid lines when the tines 13a, 13b, 13c are in a lowered position and in dashed lines when the tines 13a, 13b, 13c are in a raised position. Furthermore, in FIG. 5C, a neighboring cylinder 211 on a separate harrow section is shown for context.

In FIG. 5A, FIG. 5B and FIG. 5C, the connecting bar 16a may be pivotally connected to the linkage bar 95 by the pin 97a through only one possible aperture 98a. The connecting bar 16b may be pivotally connected to the linkage bar 95 by the pin 97b through two possible apertures 98b (as seen in FIG. 5A and FIG. 5B), and 98d (as seen in FIG. 5C). The connecting bar 16c may be pivotally connected to the linkage bar 95 by the pin 97c through two possible apertures 98c (as seen in FIG. 5A), and 98e (as seen in FIG. 5B and FIG. 5C). By comparing the relative positions at the lowermost positions of the distal ends 25a, 25b, 25c of the tines 13a, 13b, 13c in FIG. 5A, FIG. 5B and FIG. 5C, it is apparent that the relative positions in relation to the field of the distal ends 25a, 25b, 25c of the tines 13a, 13b, 13c, and therefore the aggressiveness of the interaction of the tines 13a, 13b, 13c with the field, may be selectively controlled by selecting the apertures at which the connecting bars 16a, 16b are connected to the linkage bar 95. The apertures 98a, 98b, 98c, 98d, 98e, 98f are spaced-apart longitudinally on the linkage bar 95, therefore the same longitudinal translation of the linkage bar 95 will result in a different amount of rotation of the transverse rotatable axles 14a, 14b, 14c depending on the apertures at which the connecting bars 16a, 16b are connected. The differing amount of rotation of the transverse rotatable axles 14a, 14b, 14c results in differences in the relative positions of the tines 13a, 13b, 13c in relation to the field. Additionally or alternatively, the relative positions of the tines 13a, 13b, 13c in relation to the field may be controlled by differing the lengths of one or more of the connecting bars 16a, 16b, 16c.

Figure 6:
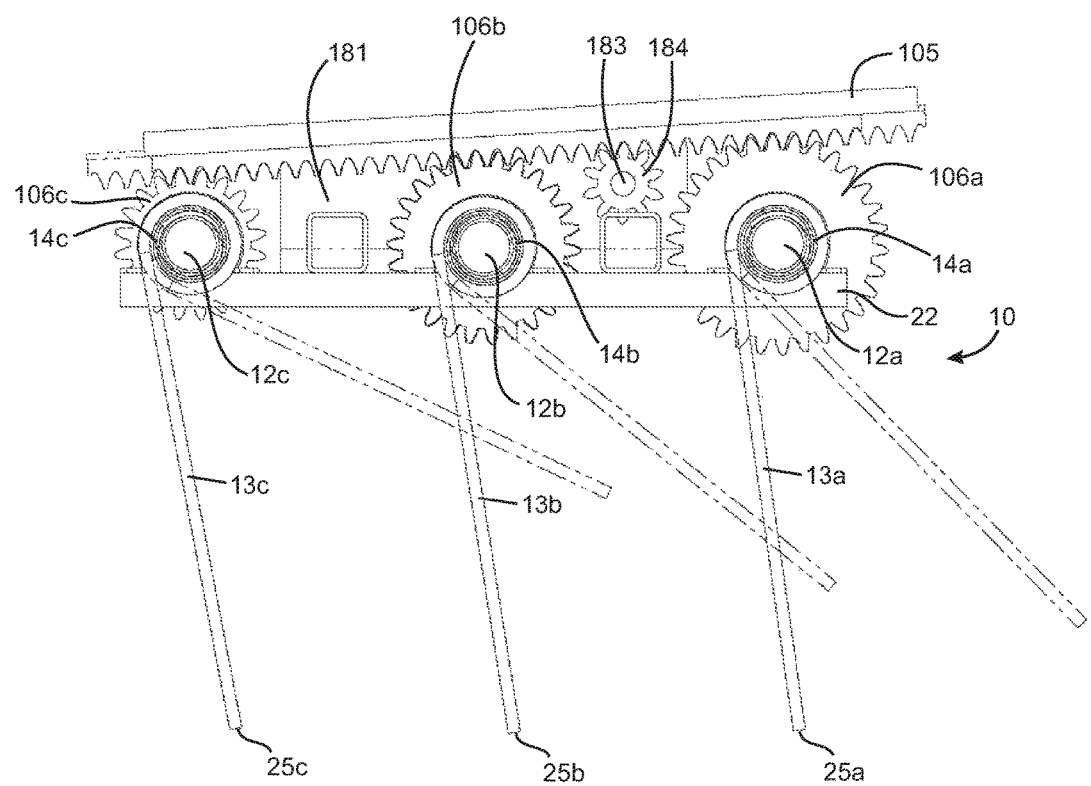
FIG. 6 is a side view of a section of a tine harrow having three transverse rows of harrow tines illustrating how a rack and pinion mechanism selectively controls relative positions of the tines in the rows in relation to a surface of a field.

FIG. 6 illustrates a second embodiment of how relative positions of tines of a tine harrow in relation to a surface of a field may be selectively controlled. In FIG. 6, the harrow section 10 has three transverse rows 12a, 12b, 12c of harrow tines 13a, 13b, 13c rigidly mounted on respective transverse rotatable axles 14a, 14b, 14c as described in connection with FIG. 1A. Mounted concentrically on the transverse axles 14a, 14b, 14c are toothed pinions 106a, 106b, 106c, respectively, which rotate with the transverse axles 14a, 14b, 14c. A longitudinally-oriented elongated translatable toothed rack 105 is configured so that the teeth of the rack 105 mesh with the teeth of the pinions 106a, 106b, 106c. The teeth of the toothed rack 105 also mesh with teeth of a drive gear 184 mounted on a drive shaft 183 of a motor 181. Rotation of the drive shaft 183 by the motor 181 causes rotation of the drive gear 184, which causes the toothed track 105 to translate longitudinally. Longitudinal translation of the toothed track 105 causes the pinions 106a, 106b, 106c to rotate, thereby causing rotation of the transverse axles 14a, 14b, 14c, which causes the tines 13a, 13b, 13c to rotate thereby lowering or raising the distal ends 25a, 25b, 25c of the tines 13a, 13b, 13c. Whether the tines 13a, 13b, 13c are lowered or raised is controlled by the direction that the motor 181 drives the drive shaft 183. Because the 106a, 106b, 106c have different diameters, the pinions 106a, 106b, 106c will each rotate through a different angle of arc, resulting in the tines 13a, 13b, 13c rotating through a different angle of arc, resulting in the distal ends 25a, 25b, 25c of the tines 13a, 13b, 13c of each row 12a, 12b, 12c achieving different positions in relation to the field. By selecting pinions of appropriate diameter, the relative positions of the tines in each row may be selected. One or more of the pinions 106a, 106b, 106c may be changed out for a differently sized pinion or a pinion with a different number of teeth when desired, provided the rack 105 is configurable to mesh with all of the pinions if desired.

Figure 7:
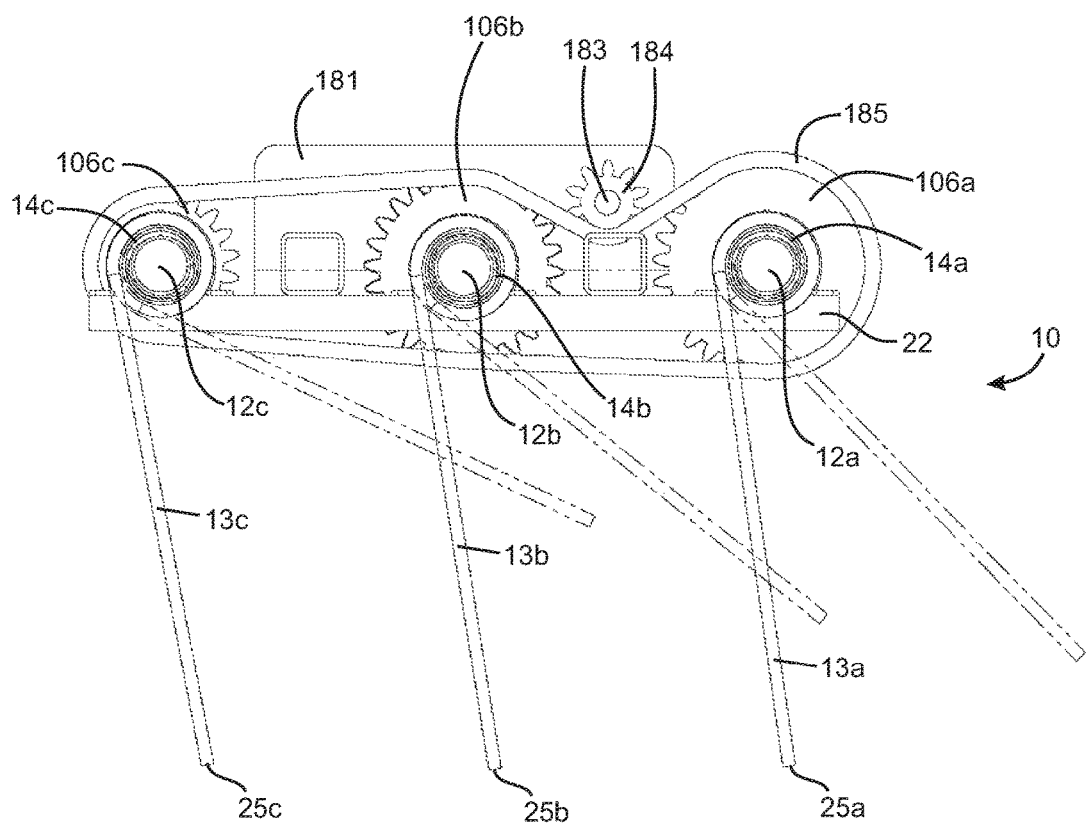
FIG. 7 is a side view of a section of a tine harrow having three transverse rows of harrow tines illustrating how a chain and pinion mechanism selectively controls relative positions of the tines in the rows in relation to a surface of a field.

FIG. 7 illustrates a third embodiment of how relative positions of tines of a tine harrow in relation to a surface of a field may be selectively controlled. The embodiment depicted in FIG. 7 is similar to the one in FIG. 6 except that the toothed rack is replaced with an endless loop drive chain 185. The drive chain 185 meshes with the teeth of the pinions 106a, 106b, 106c and with the teeth of the drive gear 184. The chain 185 may be driven in either direction to lower and raise the tines 13a, 13b, 13c. Operation of the embodiment in FIG. 7 is essentially the same as the one described in connection with FIG. 6.

The novel features of the present invention will become apparent to those of skill in the art upon examination of the detailed description of the invention. It should be understood, however, that the scope of the claims should not be limited by the preferred embodiments set forth in the examples but should be given the broadest interpretation consistent with the specification as a whole.

The invention claimed is:

1. A tine harrow comprising a plurality of harrow tines mounted on and downwardly depending from a harrow frame, the harrow tines configured to be moveable between a lowered position and a raised position, wherein at least one harrow tine is lowerable or raiseable to a different relative position in relation to a surface of a field than others of the harrow tines, and wherein the tine harrow further comprises:

a plurality of longitudinally spaced-apart rotatable transverse axles mounted on the harrow frame, the harrow tines mounted directly on the transverse axles and rotatable with the transverse axles to be lowered or raised in relation to the surface of the field when the transverse axles rotate;

a longitudinally-oriented translatable linkage bar connecting the transverse axles;

a plurality of connecting bars rigidly mounted directly on the transverse axles, the connecting bars pivotally connected directly to the linkage bar thereby pivotally connecting the transverse axles to the linkage bar; and, an actuator pivotally mounted on the frame and pivotally connected to one connecting bar, the actuator connected to the one connecting bar at a position on the one connecting bar different from a position where the one connecting bar is pivotally connected to the linkage bar, the actuator pivotally mounted on the frame at a position longitudinally spaced-apart from the one connecting bar to which the actuator is pivotally connected, wherein at least one of the connecting bars is connectable to the linkage bar at a different relative location in relation to the transverse axle on which the at least one connecting bar is mounted than the relative locations at which other of the connecting bars are connected to the linkage bar in relation to the transverse axles on which the other connecting bars are mounted, whereby actuation of the actuator causes rotation of the one connecting bar along an arcuate path, the rotation of the one connecting bar causing longitudinal translation of the linkage bar, the longitudinal translation of the linkage bar causing the plurality of connecting bars to rotate along arcuate paths.

2. The harrow according to claim 1, wherein the harrow frame comprises at least one section of tines, the plurality of harrow tines in one section of the at least one section is arranged in a plurality of transverse rows, and the tines in at least one transverse row in the one section are lowerable or raiseable to the different relative position in relation to the surface of the field than others of the tines in the one section.

3. The harrow according to claim 2, wherein the plurality of tines is lowered and raised by rotation of the tines about respective transverse axes, and the tines that are lowerable or raiseable to the different relative position are selectively lowerable or raiseable to at least two different relative positions.

4. The harrow according to claim 3, wherein the transverse axes are defined by the longitudinally spaced-apart rotatable transverse axles mounted on the harrow frame, wherein the translation of the linkage bar rotates the transverse axles about the transverse axes thereby rotating the tines thereby lowering or raising the tines.

5. The harrow according to claim 4, wherein at least one of the connecting bars is selectively connectable to the linkage bar at at least two different longitudinally spaced-apart locations on the linkage bar, wherein the locations are configured so that connection of the at least one of the connecting bars at a first location selects a first relative position in relation to the surface of the field to which the tines may be lowered or raised, and connection of the at least one of the connecting bars at a second location selects a second relative position in relation to the surface of the field to which the tines may be lowered or raised.

6. The harrow according to claim 5, wherein the connecting bars are connectable to the linkage bar by pins through apertures in the linkage bar, and the at least one of the connecting bars is selectively connectable by one of the pins through apertures at the least two different longitudinally spaced-apart locations on the linkage bar.

7. The harrow according to claim 4, wherein at least one of the connecting bars is selectively connectable to the linkage bar at at least two different spaced-apart locations on the connecting bar, wherein the locations are configured so that connection of the at least one of the connecting bars at a first location selects a first relative position in relation to the surface of the field to which the tines may be lowered or raised, and connection of the at least one of the connecting bars at a second location selects a second relative position in relation to the surface of the field to which the tines may be lowered or raised.

8. The harrow according to claim 7, wherein the connecting bars are connectable to the linkage bar by pins through apertures in the linkage bar, and the at least one of the connecting bars is selectively connectable by one of the pins through apertures at the least two different spaced-apart locations on the at least one connecting bar.

9. The harrow according to claim 1, wherein the actuator comprises a hydraulic cylinder, an electrical actuator or an inflatable air bag with tension spring.

\* \* \* \* \*